March 27, 1962 G. D. STOUGH 3,026,820
MEANS FOR ANCHORING MERCHANDISE CARRYING
RACKS WITHIN THE STORAGE CHAMBERS
OF TRANSPORT VEHICLES
Filed May 15, 1959 3 Sheets-Sheet 1
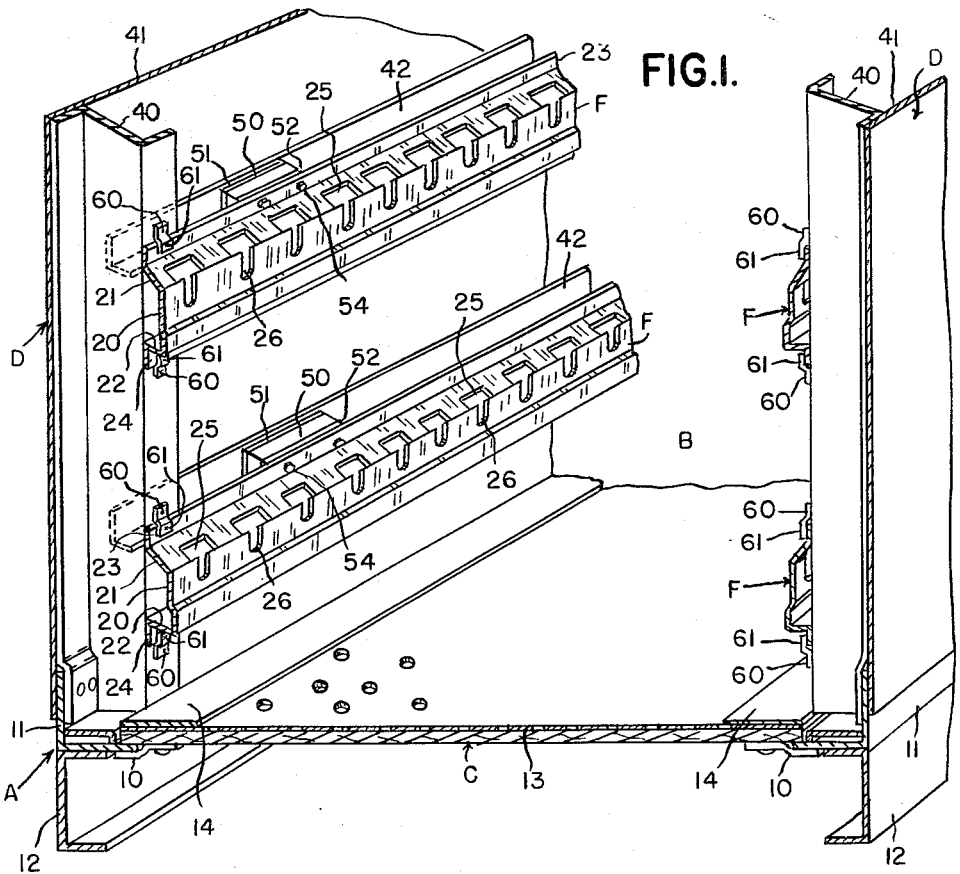
INVENTOR.
GERALD D. STOUGH
BY
Whittemore, Hulbert & Belknap
ATTORNEYS March 27, 1962  G. D. STOUGH  3,026,820
MEANS FOR ANCHORING MERCHANDISE CARRYING
RACKS WITHIN THE STORAGE CHAMBERS
OF TRANSPORT VEHICLES
Filed May 15, 1959  3 Sheets-Sheet 2
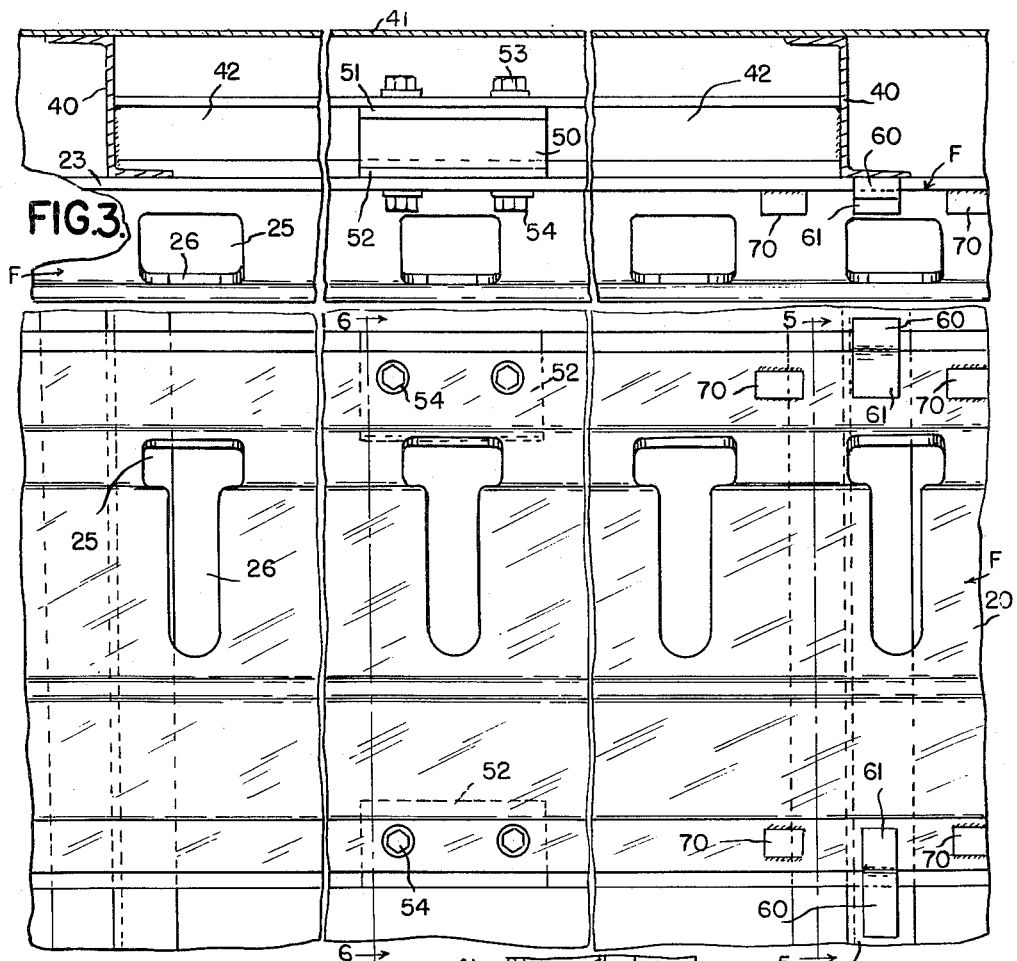
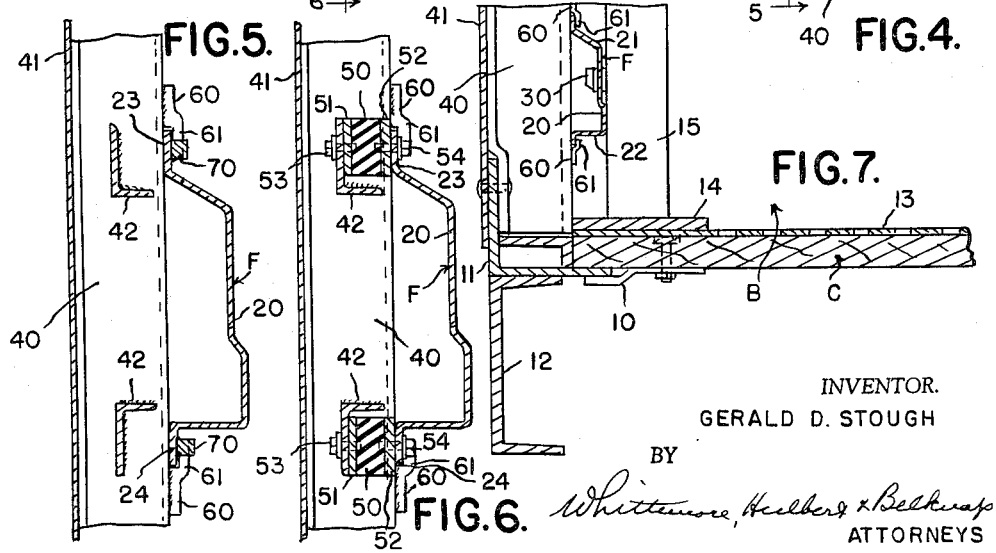
INVENTOR.
GERALD D. STOUGH
BY
Whittemore, Hulbert & Belknap
ATTORNEYS March 27, 1962
G. D. STOUGH
3,026,820
MEANS FOR ANCHORING MERCHANDISE CARRYING
RACKS WITHIN THE STORAGE CHAMBERS
OF TRANSPORT VEHICLES
Filed May 15, 1959
3 Sheets-Sheet 3
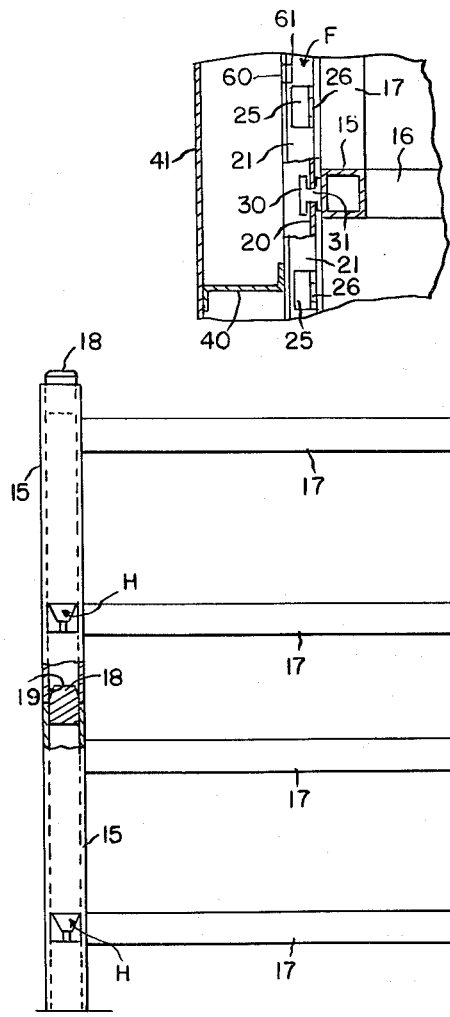
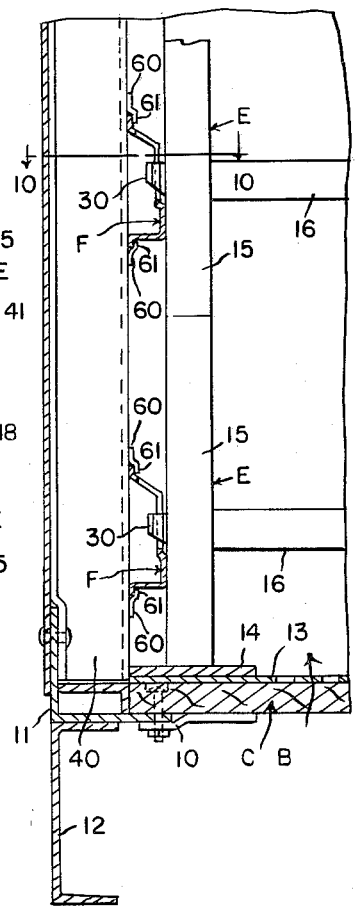
INVENTOR.
GERALD D. STOUGH
BY
Whittemore, Hulbert & Belknap
ATTORNEYS United States Patent Office 3,026,820
Patented Mar. 27, 1962

3,026,820
MEANS FOR ANCHORING MERCHANDISE CARRYING RACKS WITHIN THE STORAGE CHAMBERS OF TRANSPORT VEHICLES
Gerald D. Stough, Detroit, Mich., assignor to Whitehead & Kales Company, River Rouge, Mich., a corporation of Michigan
Filed May 15, 1959, Ser. No. 813,539
1 Claim. (Cl. 105—369)

This invention relates generally to means for anchoring portable merchandise carrying racks within the longitudinally extending storage chambers of transport vehicles such as railway boxcars or enclosed cargo carrying trailers, and is an improvement upon the subject matter of my Patent 2,808,788 dated October 8, 1957.

One of the essential objects of the invention is to provide the opposed longitudinally extending upright side walls of the storage chamber of the transport vehicle with yieldable anchorage means for the portable merchandise carrying racks.

Another object is to provide yieldable anchorage means of the type mentioned that includes means for cushioning and yieldingly resisting movement of the portable merchandise carrying racks lengthwise of the longitudinally extending storage chamber when the transport vehicle is subjected to shock loads while in transit or while being coupled to a stationary vehicle.

Another object is to provide yieldable anchorage means of the type mentioned that include longitudinally movable horizontally extending anchorage rails to which outwardly projecting anchorage lugs at opposite ends of the merchandise carrying racks may be detachably interlocked automatically when said racks are moved vertically toward the floor of the storage chamber of the transport vehicle by a conventional lift truck or the like.

Another object is to provide yieldable anchorage means of the type mentioned that permit the static load of the merchandise carrying racks to be supported upon the floor of the storage chamber of the transport vehicle independently of the anchorage rails and of the upright side walls of the storage chamber when the anchorage lugs at opposite ends of the portable racks are detachably interlocked to said anchorage rails.

Another object is to provide yieldable anchorage means that include elastic or flexible connections between the anchorage rails for the racks and the upright side walls of the storage chamber of the transport vehicle.

Another object is to provide yieldable anchorage means wherein the elastic or flexible connections mentioned yieldingly resist longitudinal movement of the horizontally extending anchorage rails to which the portable racks are detachably interlocked.

Another object is to provide the longitudinally movable horizontally extending anchorage rails aforesaid with slideways fixed to the upright side walls of the storage chamber for guiding said anchorage rails during longitudinal movement thereof.

Another object is to provide slideways that are interengaged in such a way with the horizontally extending longitudinally movable anchorage rails that the latter are effectively held against both vertical and lateral movements relative to the upright side walls of the storage chamber while moving lengthwise thereof.

Another object is to provide on the horizontally extending longitudinally movable anchorage rails at longitudinally spaced points thereof abutments or stops that are normally spaced from opposite sides of said fixed slideways and that are alternately engageable with said fixed slideways during longitudinal movement of said anchorage rails for limiting the longitudinal movement of said rails, so that such rails will be prevented from accidentally moving longitudinally beyond predetermined limits in the event the elastic or flexible connections aforesaid should rupture or break loose.

Another object of the invention is to provide a yieldable anchorage means of the type mentioned that is simple in construction, economical to manufacture, easy to install and efficient in operation.

Other objects, advantages and novel details of construction of this invention will be made more apparent as this description proceeds, especially when considered in connection with the accompanying drawings wherein:

FIGURE 1 is a fragmentary perspective view with parts broken away and in section of a longitudinally extending storage chamber of a transparent vehicle, and showing the opposed longitudinally extending upright side walls thereof equipped with yieldable anchorage means for portable merchandise carrying racks.

FIGURE 2 is a perspective view of one of the portable merchandise carrying racks adapted to extend transversely of the storage chamber aforesaid, and provided at opposite ends thereof with horizontally projecting substantially T-shaped anchorage lugs adapted to be detachably interlocked with the yieldable anchorage means upon the opposed side walls of said storage chamber.

FIGURE 3 is a fragmentary top plan view of a portion of one upright side wall of the storage chamber, and of the yieldable anchorage means carried thereby.

FIGURE 4 is an elevational view of the structure illustrated in FIGURE 3.

FIGURE 5 is a fragmentary vertical sectional view taken substantially on the line 5—5 of FIGURE 4.

FIGURE 6 is a fragmentary vertical sectional view taken substantially on the line 6—6 of FIGURE 4.

FIGURE 7 is an enlarged fragmentary vertical sectional view through the transport vehicle at one side thereof, and showing a portion of one upright or post of a portable rack supported upon the floor of the storage chamber and detachably interlocked to the yieldable anchorage means on an adjacent upright side wall of the storage chamber.

FIGURE 8 is an end elevation of a plurality of merchandise carrying racks arranged in a vertical stack and showing parts broken away and in section.

FIGURE 9 is a fragmentary cross sectional view through the transport vehicle, and showing portions of a plurality of merchandise carrying racks arranged in a vertical stack and anchored to the yieldable anchorage means upon an adjacent upright side wall of the storage chamber.

FIGURE 10 is a horizontal sectional view taken substantially on the line 10—10 of FIGURE 9.

In the drawings, A is a transport vehicle having a longitudinally extending storage chamber B provided with a longitudinally extending load-sustaining floor C, and provided above said floor with opposed longitudinally extending substantially parallel upright side walls D.

Preferably the floor C is carried by and is secured by clips 10 to angle irons 11 resting upon and secured to the side sills 12 of the transport vehicle, and is provided upon its upper surface with a protective perforated metal plate 13. Reinforcing strips 14 of metal cover the metal plate 13 at opposite longitudinal side edges thereof, and may be secured thereto by any suitable means (not shown).

E is a portable merchandise carrying rack having a length substantially equal to the distance between the upright side walls D of the storage chamber and comprising a horizontally extending substantially rectangular frame having upright corner posts 15 and substantially horizontal side and end bars 16 and 17 respectively extending between and rigidly connected to said posts intermediate their upper and lower ends. Such posts 15 and bars 16 and 17 may be any suitable construction and may be formed of any suitable material. For example, the bars 16 and 17 may be varied in construction or configuration according to the kind or type of merchandise to be carried thereby. The posts 15 constitute load-sustaining elements, and are adapted to be supported upon the floor C of the storage chamber to transmit thereto the static load of the merchandise carrying rack.

Preferably the posts 15 of each rack E are provided at their upper ends with upwardly projecting pilot portions 18, and are provided at their lower ends with downwardly opening recesses or sockets 19, so that the pilot portions 18 at the upper ends of the posts 15 of one rack E may be telescopically engaged with the socket portions 19 at the lower ends of the posts 15 of a superimposed rack E in a stack as in my Patent 2,808,788 aforesaid. Thus the racks may be carried into the storage chamber B by a conventional motorized lift truck or the like (not shown), and may then be positioned in stacked relation within the storage chamber by the lift truck, so that all available space within said storage chamber may be utilized for the reception of said racks.

For anchoring the stacked racks E within the storage chamber B of the transport vehicle, so that the racks at each level will be close to each other but out of stress communicating contact, I have provided vertically spaced horizontally extending anchorage rails F that are substantially parallel to and extend longitudinally of the upright side walls D of the storage chamber, and have provided the opposite ends of each rack E with transversely spaced horizontally projecting substantially T-shaped anchorage lugs H that are rigidly secured to the posts 15 of each rack and are adapted to become detachably interlocked automatically with said anchorage rails F when the racks E are moved vertically toward the floor C of the storage chamber by the conventional lift truck aforesaid.

The anchorage rails F may be formed of any suitable material such as sheet metal, and are identical in construction. Preferably each anchorage rail F has an upright web portion 20, upper and lower laterally extending portions 21 and 22 respectively at the upper and lower edges of said upright portion 20 and vertically extending flange portions 23 and 24 respectively at the outer edges of said laterally extending portions 21 and 22.

The vertically extending portion 23 projects upwardly from the laterally extending portion 21, while the vertically extending portion 24 projects downwardly from the laterally extending portion 22.

The upper laterally extending portion 21 is provided with longitudinally spaced longitudinally extending substantially rectangular apertures 25 that are uniform in size and open upwardly, while the upright web portion 20 is provided with longitudinally spaced vertically extending elongated slots or apertures 26 that are uniform in width and open upwardly into the apertures 25 substantially midway the ends thereof.

The spacing of the apertures 25 and 26 lengthwise of the rails F corresponds to the transverse spacing of the T-shaped anchorage lugs H on opposite ends of the racks E, so that the apertures 25 and slots 26 may be engaged automatically by the heads 30 and stems 31 respectively of the anchorage lugs H on opposite ends of the racks when the latter are lowered vertically toward the floor C of the storage chamber by the lift truck (not shown) to become detachably interlocked automatically with the rails F. Also, it is to be noted that the depth of the slots 26 is such that the lower ends thereof are spaced below the stem portions 31 of the lugs H when the latter are interlocked as aforesaid, so that the rails F are entirely free of the static load of the racks E. However, the material of the upright web portion 20 on opposite sides of each slot 26 in cooperation with the stems 31 of the lugs will limit horizontal movement of the racks E longitudinally of the storage chamber, while the interlocking engagement between the heads 30 of the lugs H and said upright web portions 20 will limit horizontal movement of the racks transversely of the storage chamber. The static load of the upper racks E of a stack will be carried through the posts thereof into the posts 15 of the racks below the same and thence to the floor C of the storage chamber.

In the present instance, I have provided elastic or flexible connections between the anchorage rails F and the upright side walls D of the storage chamber of the transport vehicle for cushioning and yieldingly resisting movement of the anchorage rails F and portable racks E detachably connected thereto in directions longthwise of the longitudinally extending storage chamber B when the transport vehicle is subjected to shock loads while in transit or while being coupled to a stationary vehicle.

Preferably each upright side wall D of the storage chamber of the transport vehicle is provided throughout its length, except at the usual door openings or doorways (not shown), with longitudinally spaced uprights or posts 40 of substantially Z shape in cross section to which the outer sheathing or wall panels 41 of the side walls are secured. Other posts (not shown) are provided at opposite upright side edges of each door opening or doorway and are also secured to the outer sheathing 41.

Extending horizontally between and terminally connected to adjacent uprights or posts 40 are supporting rails 42 for the horizontally extending anchorage rails F. Preferably these supporting rails 42 are spaced horizontally from and are substantially parallel to the anchorage rails F. Elongated substantially rectangular elastic or flexible blocks 50 are located between and extend longitudinally of the parallel rails F and 42, and metal plates 51 and 52 respectively are between the blocks 50 and the rails 42 and F. Preferably these plates 51 and 52 are secured in surface-to-surface relation to opposite longitudinal sides of the blocks 50, and are secured by bolts 53 and 54 respectively to the rails 42 and F.

Rigidly secured to the uprights or posts 40 at points above and below the anchorage rails F are vertically extending elongated brackets 60 having L-shaped arm portions 61 that overlap the vertical flanges 23 and 24 respectively of said anchorage rails F and provide slideways for the anchorage rails F. Such arms 61 serve to guide the anchorage rails F during longitudinal movement thereof, and to hold said rails F against both vertical and lateral movement relative to the upright side walls D of the storage chamber while moving lengthwise thereof.

Located on the inner sides of the vertical flanges 23 and 24 of the anchorage rails F at longitudinally spaced points thereof are blocks 70 of the metal that are rigidly secured to said flanges 23 and 24 and are normally spaced from opposite sides of the fixed slideways or brackets 60. Such blocks 70 are alternately engageable with the fixed slideways 60 during longitudinal movement of the anchorage rails F and serve as stops or abutments for limiting the longitudinal movement of said rails F so that such rails will be prevented from accidentally moving longitudinally beyond predetermined limits in the event the elastic or flexible blocks 50 should rupture or break loose.

In use, a rack E may be initially carried into the storage chamber B by a suitable lift truck (not shown) and then may be positioned by said lift truck in an elevated position extending transversely of the storage chamber B of the transport vehicle, so that the anchorage lugs H at opposite ends of the rack E will be above and in vertical alignment with the apertures 25 in the anchorage rails F. Then the rack E is lowered vertically by the lift truck so that the heads 30 of the anchorage lugs H will move downwardly through the apertures 25 in the lateral portions 21 of the anchorage rails F. Further vertical downward movement of the rack E by the lift truck will cause the heads 30 of the anchorage rails F to pass downwardly behind the upright portions 20 of the anchorage rails F and will cause the stems 31 of said anchorage lugs H to move downwardly in the elongated slots 26. In this position, the posts 15 of the rack are supported upon the floor C of the storage chamber, the opposite ends of the rack E are bridged by the horizontally extending anchorage rails F, and the anchorage lugs H on opposite ends of the rack are detachably interlocked with the anchorage rails F.

When the racks E are arranged in stacked relation, the posts 15 of the upper racks will rest upon and be supported by the posts 15 of the lower racks. Thus the load of any single rack or the load of the stacked racks is carried by the floor C of the storage chamber independently of the side walls D and anchorage rails F.

When the transport vehicle in which the racks E are anchored is stopped suddenly while in motion in either a forward or a rearward direction there is a tendency of the racks E to shift or move lengthwise of the longitudinally extending storage chamber of the transport vehicle. When this occurs the elastic or flexible blocks 50 will yieldingly resist longitudinal movement of the horizontally extending longitudinally movable anchorage rails F to which the portable racks E are detachably connected, and thereby will yieldingly restrain movement of said racks E lengthwise of the storage chamber. The fixed slideways 61 will guide the anchorage rails F during such longitudinal movement, and will hold said rails F against both vertical and lateral movement relative to the upright side walls D of the storage chamber.

Should the elastic or flexible blocks 50 rupture or break lose during longitudinal movement of the anchorage rails F in either a rearward or forward direction lengthwise of the storage chamber, then the metal blocks 70 on the anchorage rails F advancing toward the fixed slideways 61 on the uprights or posts 40 will abut the slideways 61 in the path thereof and thereby will limit such longitudinal movement of the anchorage rails F and racks E detachably connected thereto.

The heads 30 of the anchorage lugs H on opposite ends of the racks E in cooperation with the upright web portions 20 of the anchorage rails F will restrain the racks E from movement transversely of the storage chamber of the transport vehicle. Thus, in each instance the stresses occasioned by any longitudinal or transverse movement of the racks E will be transmitted to the rails F and through them to the side walls D of the storage chamber B, but the static load of the racks E will always be transmitted by the posts 15 of the racks to the floor C of the storage chamber independently of said anchorage rails F and side walls D.

Thus with my construction, the merchandise carried by the racks E need not be removed therefrom from the time such merchandise is initially loaded onto the racks at the factory where such merchandise is manufactured. By the use of a lift truck (not shown) the racks E individually or in a stack may be carried into and positioned within the storage chamber B of the transport vehicle, so that the anchorage lugs H on opposite ends of the racks E may be detachably interlocked with the anchorage rails F. For example, the racks E may be lowered by a lift truck from a raised position in the storage chamber to a position where the anchorage lugs H on opposite ends of the racks are engageable with the upwardly opening apertures 25 and slots 26 in the anchorage rails F. Such lift truck may then be used to deposit the racks on the floor C, or on top of another rack in a stack. In other words, interlocking engagement between the anchorage lugs H and the anchorage rails F is effected by a vertical downward movement of the racks E relative to the anchorage rails F.

Likewise a lift truck (not shown) may be used to remove the racks E from the storage chamber B of the transport vehicle. For example, the racks E may be raised by a lift truck to disengage the anchorage lugs H from the anchorage rails F so that the racks E may thereafter be removed by the lift truck from the storage chamber B of the transport vehicle.

Thus, after the original or initial loading of the merchandise on the racks E at the factory, the merchandise may remain intact on the racks until they reach their final destination. Accordingly, a great saving in labor, time and eventual cost of the merchandise is obtained. Moreover, the construction of the anchorage means for the racks is such that the merchandise will not be damaged while in transit.

What I claim as my invention is:

In a transport vehicle having an elongated floor and having an upright side wall extending lengthwise of said floor and provided with two longitudinally spaced upright posts; a pair of vertically spaced substantially parallel horizontally extending supporting rails extending lengthwise of said side wall between and terminally secured to said spaced posts, a horizontally extending longitudinally movable anchorage rail upon the inner sides of and freely crossing said posts, said anchorage rail extending lengthwise of and disposed substantially parallel to said side wall, said anchorage rail extending longitudinally of, disposed in substantially parallel relation to, and bridging the space between said vertically spaced supporting rails, said anchorage rail being provided lengthwise thereof along its upper end lower edges in opposed relation to and in the horizontal planes of said supporting rails with vertically extending upper and lower flange portions, said anchorage rail being provided at spaced points longitudinally thereof between said upper and lower flange portions with anchoring means for one or more portable merchandise carrying racks shiftably supported upon the floor of said vehicle, vertically spaced elastic shock absorbing elements respectively between, disposed in the horizontal planes of, and secured to the opposed portions of said supporting rails and the upper and lower flange portions of said anchorage rail to support and yieldingly resist longitudinal movement of said longitudinally movable anchorage rail, rigid members secured to said posts above and below said anchorage rail and having portions overlapping the inner surfaces of the upper and lower vertically extending flange portions of said longitudinally movable anchorage rail to constitute guiding slideways for said longitudinally movable anchorage rail and to hold said anchorage rail against both lateral and vertical displacement while being guided longitudinally, and rigid elements secured to at least one of the vertically extending flange portions of said anchorage rail in longitudinally spaced relation to and engageable with the rigid members aforesaid on said posts to limit longitudinal movement of said anchorage rail.

References Cited in the file of this patent
UNITED STATES PATENTS

| | | |
|---|---|---|
| 2,808,788 | Stough | Oct. 8, 1957 |
| 2,868,368 | Beach | Jan. 13, 1959 |
| 2,977,899 | Doherty et al. | Apr. 4, 1961 |